US012186930B2

(12) United States Patent
Miyaki

(10) Patent No.: US 12,186,930 B2
(45) Date of Patent: Jan. 7, 2025

(54) CHAINSAW

(71) Applicant: Yamabiko Corporation, Ohme (JP)

(72) Inventor: Hiroyuki Miyaki, Tokyo (JP)

(73) Assignee: YAMABIKO CORPORATION, Ohme (JP)

( * ) Notice: Subject to any disclaimer, the term of this patent is extended or adjusted under 35 U.S.C. 154(b) by 278 days.

(21) Appl. No.: 17/961,754

(22) Filed: Oct. 7, 2022

(65) Prior Publication Data

US 2023/0113799 A1 Apr. 13, 2023

(30) Foreign Application Priority Data

Oct. 11, 2021 (JP) ................................ 2021-166804

(51) Int. Cl.
*B27B 17/14* (2006.01)
*B27B 17/02* (2006.01)

(52) U.S. Cl.
CPC .............. *B27B 17/14* (2013.01); *B27B 17/02* (2013.01)

(58) Field of Classification Search
None
See application file for complete search history.

(56) References Cited

U.S. PATENT DOCUMENTS 7,676,934 B2 3/2010 Liao
9,132,568 B2 * 9/2015 Peterson ................. B27B 17/14
2006/0000098 A1 1/2006 Kawamura
2007/0062361 A1 * 3/2007 Xiong ..................... B27B 17/14 83/814
2015/0038275 A1 * 2/2015 Saitoh ..................... B27B 17/08 474/113
2015/0059191 A1 * 3/2015 Takahashi ............... B27B 17/14 30/386
2019/0357446 A1 * 11/2019 McCue .................. A01G 3/086
2023/0113799 A1 * 4/2023 Miyaki ................... B27B 17/14 30/386

FOREIGN PATENT DOCUMENTS

CN 105134894 B 5/2018
DE 102014004061 A1 * 10/2014 ............. B27B 17/14
EP 2 825 355 B1 5/2016
JP 2013-166251 A 8/2013

OTHER PUBLICATIONS

Elglish translation of JP 2013-166251, Aug. 29, 2013.*
Extended European Search Report dated Feb. 7, 2023 issued in corresponding European application No. 22200955.7 (43 pages).

* cited by examiner

*Primary Examiner* — Hwei-Siu C Payer
(74) *Attorney, Agent, or Firm* — Rankin, Hill & Clark LLP

(57) ABSTRACT

A chainsaw includes a chain tension mechanism. The chain tension mechanism includes: an adjustment dial made of resin and rotatable about an axis in a right-left direction; a rotation transmission member made of metal and rotatable about an axis in the right-left direction; a feed screw member made of metal and rotatable about an axis in a front-rear direction; and a slide member coupled to a guide bar. The slide member is screwed to the feed screw member. A first gear of the adjustment dial is meshed with a second gear of the rotation transmission member, and a first bevel gear of the rotation transmission member is meshed with a second bevel gear of the feed screw member.

7 Claims, 4 Drawing Sheets

CHAINSAW

CROSS-REFERENCE TO RELATED APPLICATION

The present application claims the benefit of priority to Japanese Patent Application No. 2021-166804 filed on Oct. 11, 2021, the disclosures of all of which are hereby incorporated by reference in their entireties.

TECHNICAL FIELD

Field of the Disclosure

The present disclosure relates to a chainsaw equipped with a chain tension mechanism for adjusting tension of a saw chain.

RELATED ART

A chainsaw used for cutting trees, boards, or the like is equipped with a chain tension mechanism for adjusting tension of a saw chain wound around an outer circumference of a guide bar. The chain tension mechanism includes an adjustment dial provided on an outer surface of a chainsaw body and a feed screw member provided inside the chainsaw body, in which the adjustment dial is coupled to the feed screw member by a bevel gear mechanism (see U.S. Pat. No. 7,676,934, for example).

In the chain tension mechanism as described above, a slide member is screwed into a threaded groove of the feed screw member, so as to be coupled to the guide bar. When the adjustment dial is rotated, the guide bar moves in an extending direction, together with the slide member, with the rotation of the feed screw member, to change the tension of the saw chain.

SUMMARY OF THE DISCLOSURE

In the conventional chain tension mechanism described above, a bevel gear, made of resin, of the adjustment dial is meshed with a bevel gear, made of metal, of the feed screw member. With the configuration, there is a problem that teeth of the resin bevel gear are easily damaged by teeth of the metal bevel gear.

The present disclosure is intended to provide a chainsaw to solve the aforementioned problem and to be equipped with a chain tension mechanism which easily adjusts tension of a saw chain and prevents damage to an adjustment dial made of resin.

To solve the problems above, the present disclosure provides a chainsaw including: a chainsaw body; and a guide bar extending in a front-rear direction, with a rear of the guide bar coupled to the chainsaw body. The chainsaw includes a chain tension mechanism for adjusting tension of a saw chain wound around an outer circumference of the guide bar. The chain tension mechanism includes: on an outer surface of the chainsaw body, an adjustment dial made of resin and rotatable about an axis in a right-left direction, and a rotation transmission member made of metal and rotatable about an axis in the right-left direction; and inside the chainsaw body, a feed screw member made of metal and rotatable about an axis in the front-rear direction, and a slide member coupled to the guide bar. The slide member is screwed to the feed screw member to move in the front-rear direction, with rotation of the feed screw member. A first gear formed on an outer circumference of the adjustment dial is meshed with a second gear formed on an outer circumference of the rotation transmission member, and a first bevel gear formed on the rotation transmission member is meshed with a second bevel gear formed on the feed screw member.

In the chainsaw of the present disclosure, when the adjustment dial is rotated, a rotational force thereof is transmitted to the feed screw member via the rotation transmission member, and the slide member is fed in an extending direction of the guide bar, with rotation of the feed screw member. Then, the guide bar moves in the extending direction, together with the slide member, to change tension of the saw chain.

In the chainsaw of the present disclosure, the first gear provided in the adjustment dial and the second gear provided in the rotation transmission member rotate about the axes extending in the right-left direction. When two gears respectively rotating about two axes aligned in the same direction are meshed, a module of gear teeth of the gears is increased in size to enhance the strength of the gear teeth. The strength of the first gear is increased so that the first gear made of resin is prevented from being damaged by the second gear made of metal.

Further, in the chainsaw of the present disclosure, when the chain tension mechanism is operated, there is an advantage that an operator holds the outer circumference of the adjustment dial, to easily apply a rotational force.

Further, the guide bar can be securely moved with a less force because a movement amount of the guide bar is larger than a rotation amount of the adjustment dial. Still further, in the chainsaw of the present disclosure, the adjustment dial is rotated about an axis in a width direction (right-left direction) of the chainsaw body, to avoid the chainsaw body from being increased in width, even with the increase in outer diameter of the adjustment dial. Yet further, in the chainsaw of the present disclosure, the adjustment dial is made of resin, to avoid the chain tension mechanism from being increased in weight, even with the increase in outer diameter of the adjustment dial.

The chainsaw of the present disclosure has a simplified configuration of the chain tension mechanism with use of a gear mechanism, and can adjust the tension of the saw chain by rotating the adjustment dial to transmit a rotational force from the adjustment dial made of resin to the feed screw member made of metal.

DESCRIPTION OF THE EMBODIMENTS

Figure 1:
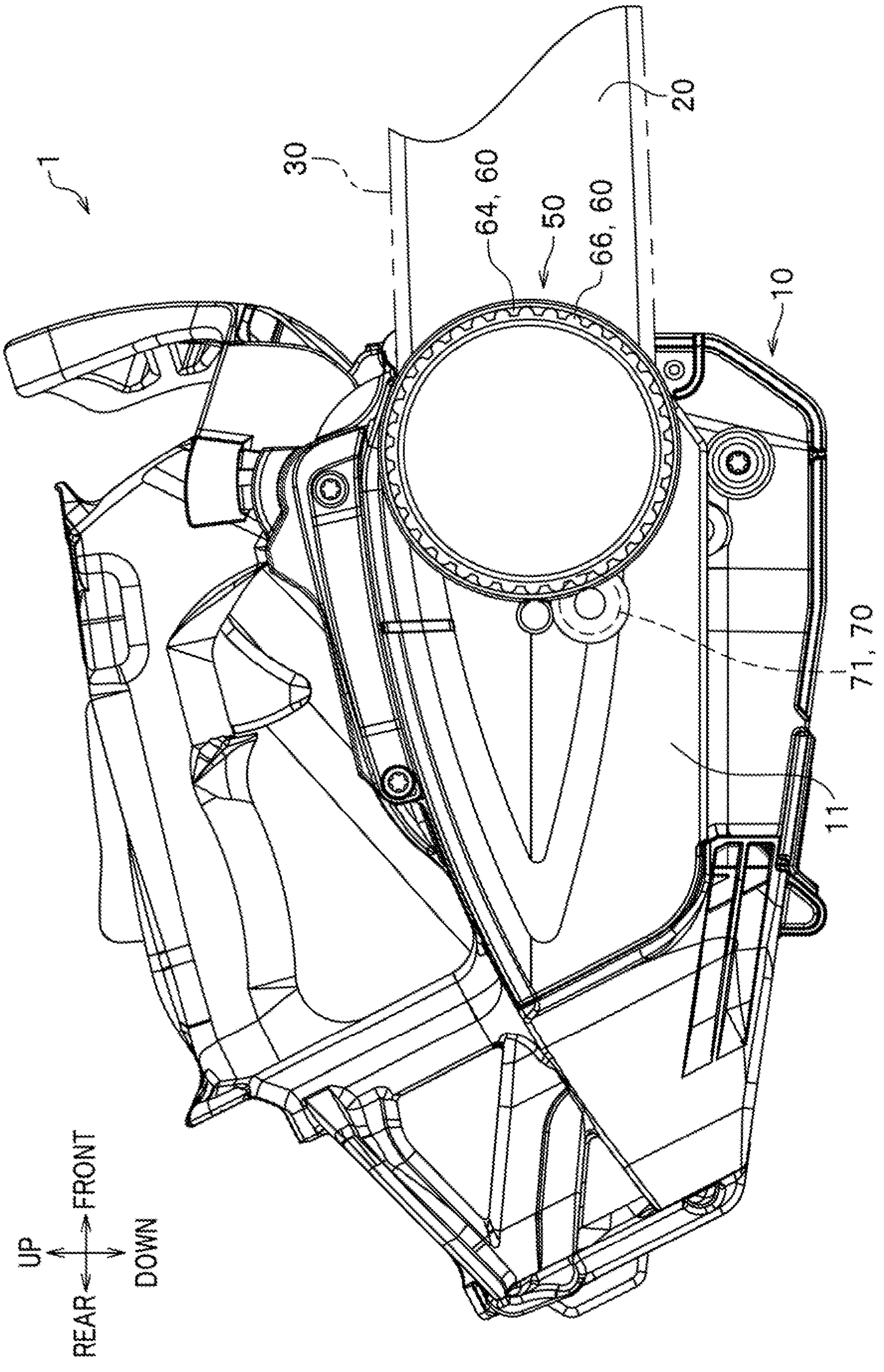
FIG. 1 is a side view of a chainsaw according to an embodiment of the present disclosure.

A description is given in detail of an embodiment of the present disclosure, with reference to the drawings as appropriate. As shown in FIG. 1, a chainsaw 1 of the present embodiment includes a chainsaw body 10, a guide bar 20 coupled to the chainsaw body 10, and a chain tension mechanism 50 for adjusting tension of a saw chain 30 wound around an outer circumference of the guide bar 20.

The chainsaw 1 of the present embodiment has the same configuration as a conventional one, except a configuration of the chain tension mechanism 50, so that a detailed description of an overall configuration of the chainsaw 1 is omitted. In the following description, the front indicates a distal end (right side in FIG. 1) of the guide bar 20.

The chainsaw body 10 includes a driver (not shown) for rotationally driving the saw chain 30, to be accommodated inside a cover 11.

Figure 4:
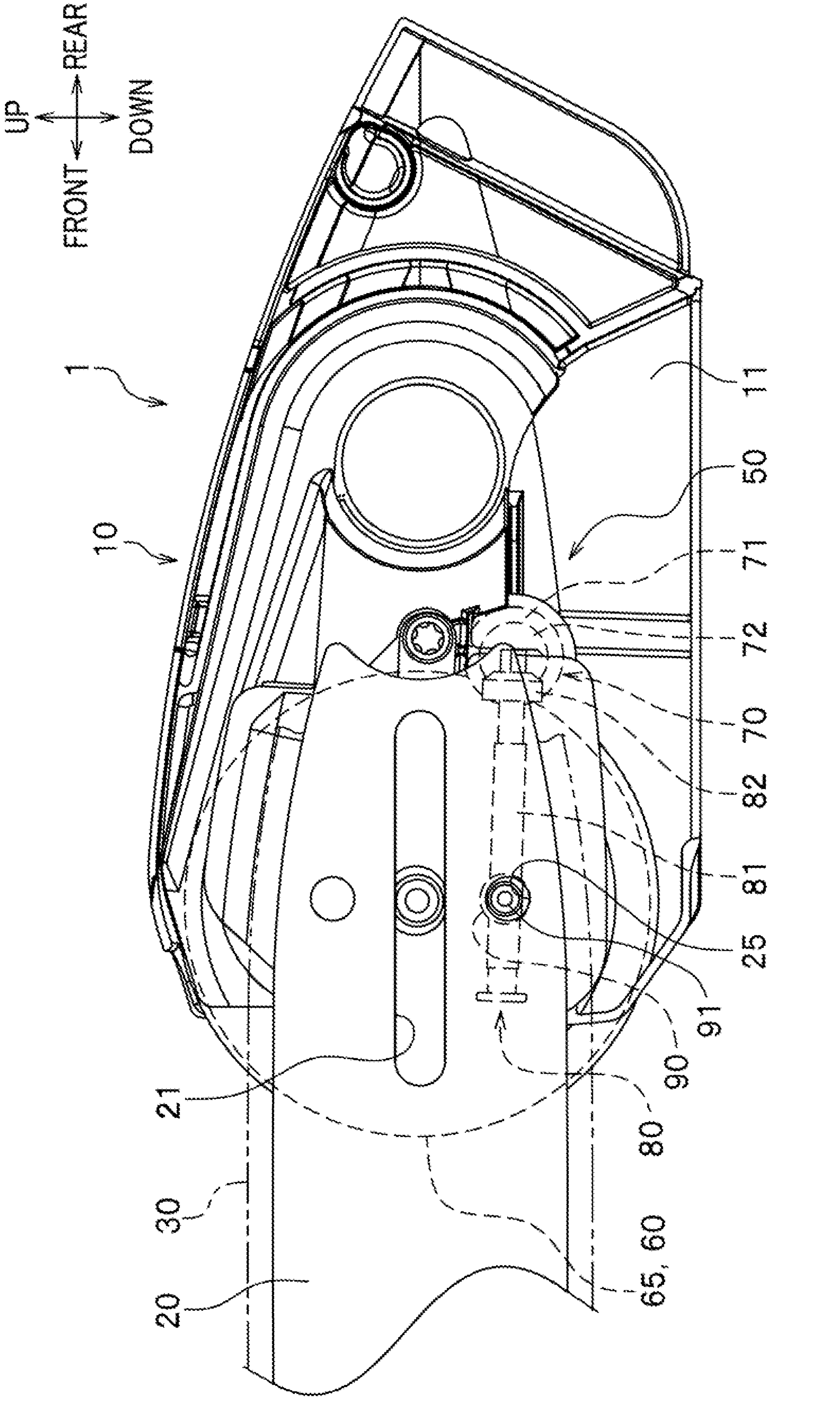
FIG. 4 is a side view of a guide bar and the chain tension mechanism of the chainsaw according to the embodiment of the present disclosure, as viewed from inside.

The guide bar 20 is a member in a plate shape extending in a front-rear direction. As shown in FIG. 4, the guide bar 20 is formed, at a rear thereof, with a slide groove 21 extending in the front-rear direction and penetrating therethrough. With a bolt (not shown) inserted into the slide groove 21 being attached to the chainsaw body 10 (see FIG. 1), the guide bar 20 is coupled to the chainsaw body 10 so as to be movable in the front-rear direction.

The saw chain 30 is an annular cutting member to be wound around the outer circumference of the guide bar 20, and a rear of the saw chain 30 is meshed with a sprocket of the driver (not shown), and the saw chain 30 is driven to rotate along the outer circumference of the guide bar 20 with a driving force of the driver.

Figure 2:
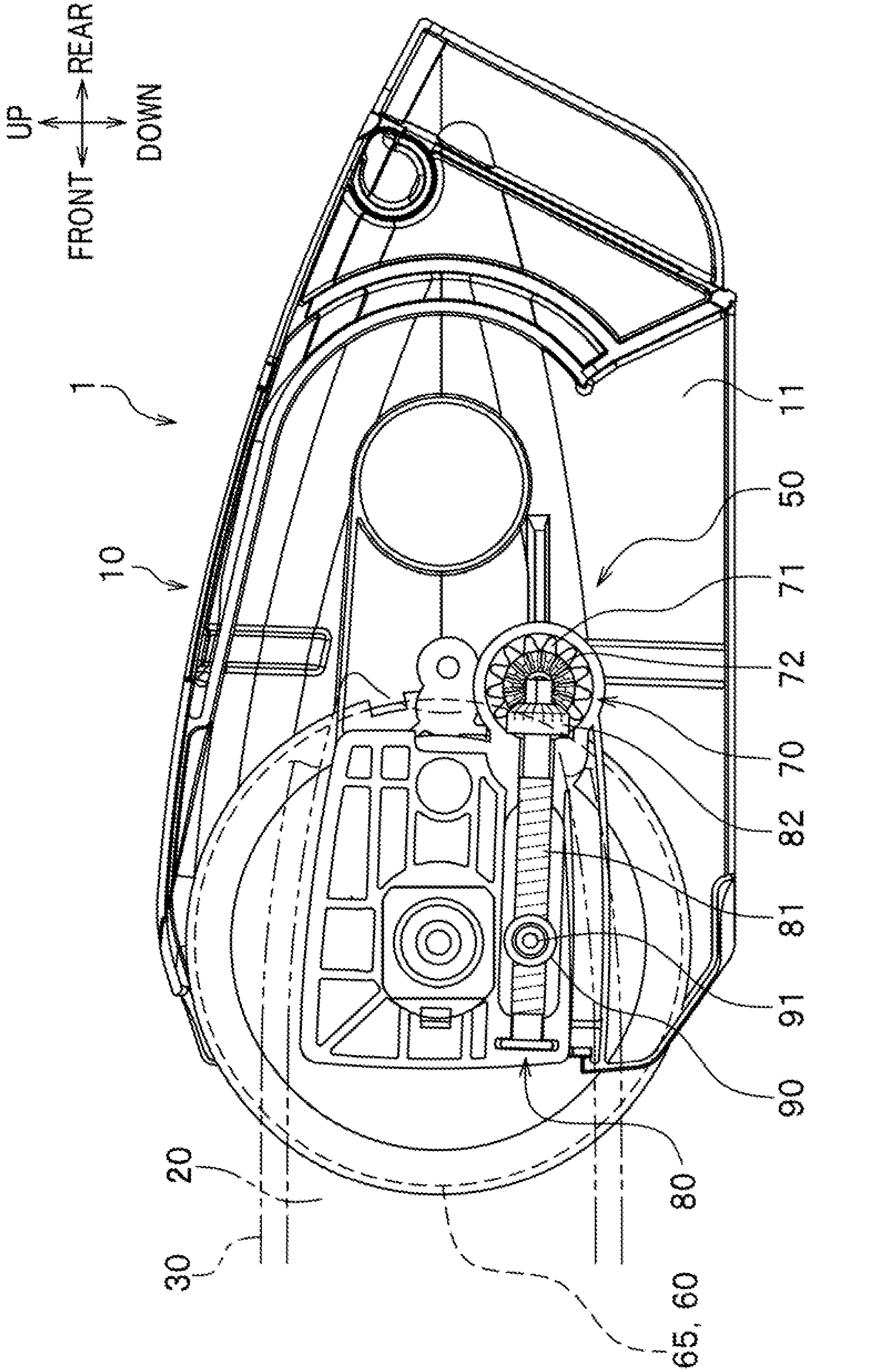
FIG. 2 is a side view of a chain tension mechanism of the chainsaw according to the embodiment of the present disclosure, as viewed from inside.

As shown in FIG. 2, the chain tension mechanism 50 includes an adjustment dial 60, a rotation transmission member 70, a feed screw member 80, and a slide member 90.

As shown in FIG. 1, the adjustment dial 60 is a cylindrical member made of resin and attached to a right side surface of the cover 11 of the chainsaw body 10. The adjustment dial 60 is held in the right side surface of the cover 11, so as to be rotatable about an axis extending in the right-left direction (width direction of the chainsaw body 10).

Figure 3:
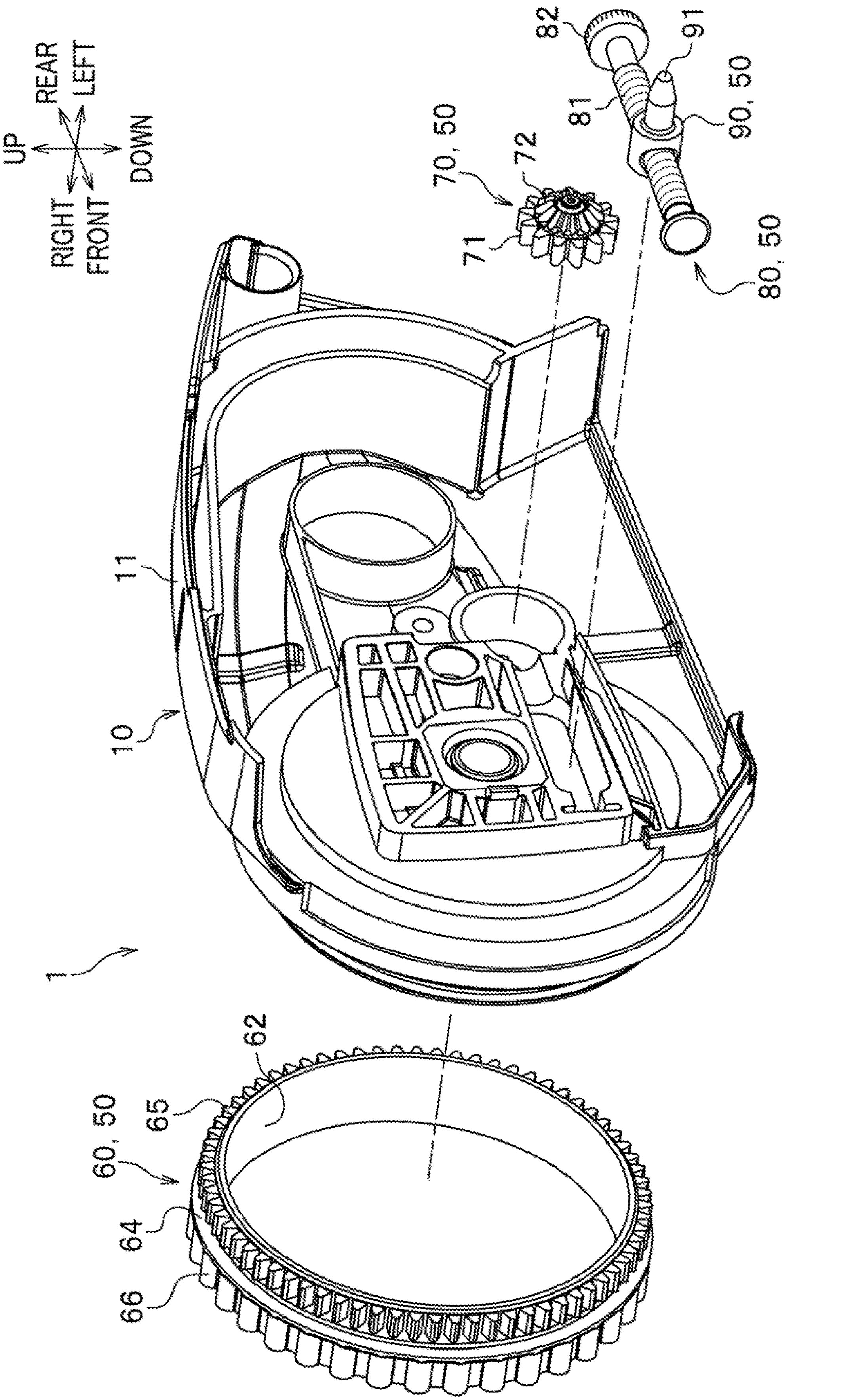
FIG. 3 is an exploded perspective view of the chain tension mechanism of the chainsaw according to the embodiment of the present disclosure, as viewed from inside.

As shown in FIG. 3, the adjustment dial 60 is provided, on an outer circumferential surface thereof, with a rib 64 extending in a circumferential direction thereof and protruding all around. The adjustment dial 60 is formed, on the outer circumferential surface thereof, with a first gear 65 at a portion thereof closer to a base end thereof (closer to an outer surface of the cover 11) than the rib 64. The first gear 65 is a cylindrical spur gear formed with teeth on an outer circumferential surface of a cylindrical member 62.

In the configuration described above, the rib 64 arranged substantially in the center in the width direction of the outer circumferential surface of the adjustment dial 60 prevents chips and dust generated during operation of the chainsaw 1 from entering a gear section in the cover 11, to avoid damage to the gear section. Further, the adjustment dial 60 and the first gear 65 are formed into a single component, and a force exerted to rotate the adjustment dial 60 directly serves as a force to rotate the first gear 65, so that the adjustment dial 60 is prevented from having an excessive force applied thereto when an operator adjusts the tension of the saw chain 30, to prevent damage to the adjustment dial 60 or the first gear 65.

The adjustment dial 60 is formed, on the outer circumferential surface thereof, with a held portion 66 at a portion closer to the distal end than the rib 64. The held portion 66 is held by a hand of the operator when the adjustment dial 60 is rotated. The held portion 66 is formed, on an outer circumferential surface thereof, with a series of wavy bumps and dips, to cause fingertips on the outer circumferential surface of the held portion 66 to become less slippery.

As shown in FIG. 2, the rotation transmission member 70 is a member made of metal and attached to the left side of the cover 11 of the chainsaw body 10. The rotation transmission member 70 is arranged behind the adjustment dial 60.

The rotation transmission member 70 is inserted into a hole formed in the cover 11 and is accommodated inside the cover 11 so as to be rotatable about an axis extending in the right-left direction. A base end portion of the rotation transmission member 70 is arranged inside in an inside-outside direction of the cover 11 (see FIG. 3), and a distal end portion of the rotation transmission member 70 is arranged outside in the inside-outside direction of the cover 11.

As shown in FIG. 3, the rotation transmission member 70 is formed, at the distal end portion thereof, with a second gear 71. The second gear 71 is a spur gear with teeth formed on an outer circumferential surface of the distal end portion of the rotation transmission member 70. A part of the second gear 71 is exposed to the adjustment dial 60 through an opening formed in the outer surface of the cover 11. Then, the second gear 71 is meshed with the first gear 65 of the adjustment dial 60 (see FIG. 1).

Thus, the first gear 65 and second gear 71 are spur gears to be arranged side by side inside the cover 11. With the configuration, a large force other than that in the rotation direction is less likely applied to the second gear 71 having a small outer diameter from the first gear 65 having a large outer diameter, to prevent damage to the first gear 65 and second gear 71. Further, the first gear 65 and second gear 71 are arranged side by side inside the cover 11 so that the width in the right-left direction of the chainsaw body 1 does not need to be increased, allowing for forming the chainsaw body 10 small in size.

In the chain tension mechanism 50 of the present embodiment, the maximum outer diameter of the first gear 65 is formed larger than the maximum outer diameter of the second gear 71. Further, a gear ratio of the second gear 71 to the first gear 65 is set in a range of 0.1 to 0.5. Still further, modules of the first gear 65 and second gear 71 are each set to 0.5 mm or more. If the maximum outer diameter of the first gear 65 is increased, the module of the teeth of the first gear 65 can be set larger, to allow for reducing damage to the resin-molded teeth. However, if the first gear 65 is formed too large with respect to the second gear 71, a pitch or the module of the second gear 71 for adapting to the first gear 65 becomes short. In contrast, if the outer diameter of the first gear 65 is set relatively small, a load on the first gear 65 and second gear 71 is reduced, but the number of rotations of the adjustment dial 60 increases when the tension of the saw chain 30 is adjusted, making the operation of the adjustment dial 60 more cumbersome. Therefore, a ratio of the maximum outer diameter of the first gear 65 to the maximum outer diameter of the second gear 71 is desirable to be in a range of 2:1 to 8:1. Further, the ratio of the maximum outer diameter of the first gear 65 to the maximum outer diameter of the second gear 71 is more desirable to be set in a range of 4:1 to 5:1.

In the chain tension mechanism 50 of the present embodiment, the maximum outer diameter of the adjustment dial 60 formed with the first gear 65 is formed significantly larger than the maximum outer diameter of the second gear 71. With the configuration, increasing the outer diameter of the adjustment dial 60 allows the number of rotations of the adjustment dial 60 to be reduced when the tension of the saw chain 30 is adjusted, to improve operability of the adjustment dial 60. In the present embodiment, the ratio of the maximum outer diameter of the adjustment dial 60 to the maximum outer diameter of the second gear 71 is set to 4.5:1. With the configuration, even if the adjustment dial 60 is formed relatively large to maintain the operability of the adjustment dial 60, with the first gear 65 and second gear 71 as spur gears being arranged side by side in the front-rear direction, the overall gear configuration does not become too large, so that the chainsaw body 10 is formed small in size in the front-rear direction.

The rotation transmission member 70 is formed, at the base end portion thereof, with a first bevel gear 72. The first bevel gear 72 is reduced in diameter toward a base end of the rotation transmission member 70.

The feed screw member 80 is a metal member in a circular cross section, extending in the front-rear direction. The feed screw member 80 is coupled to the inner surface on the left side of the cover 11, so as to be rotatable about an axis extending in the front-rear direction (see FIG. 2) . The feed screw member 80 is formed, on an outer circumferential surface thereof, with a helical threaded groove 81. The feed screw member 80 is formed, at the rear end thereof, with a second bevel gear 82. The second bevel gear 82 is reduced in diameter toward the rear end thereof, as can be easily seen in FIGS. 2 and 4.

The slide member 90 is a metal nut into which the threaded groove 81 of the feed screw member 80 is screwed (see FIG. 3). The slide member 90 is fed in the front-rear direction by the threaded groove 81 when the feed screw member 80 rotates. Thus, the slide member 90 moves in the front-rear direction with the rotation of the feed screw member 80.

The slide member 90 is formed with a coupling pin 91 protruding toward an inner side of the chainsaw body 10. As shown in FIG. 4, the coupling pin 91 is inserted into a coupling hole 25 formed in the rear of the guide bar 20. Thus, the slide member 90 is coupled to the rear of the guide bar 20.

Next, a description is given of a method of adjusting the tension of the saw chain 30 shown in FIG. 1 by the chain tension mechanism 50 of the present embodiment. When the adjustment dial 60 of the chain tension mechanism 50 is rotated, a rotational force thereof is transmitted from the first gear 65 of the adjustment dial 60 to the second gear 71 of the rotation transmission member 70 shown in FIG. 2, causing the rotation transmission member 70 to rotate about the axis in the right-left direction. Further, the rotational force is transmitted from the first bevel gear 72 of the rotation transmission member 70 to the second bevel gear 82 of the feed screw member 80, causing the feed screw member 80 to rotate about the axis in the front-rear direction.

Then, when the feed screw member 80 rotates, the slide member 90 is fed in the front-rear direction by the threaded groove 81, and the guide bar 20 (see FIG. 4), together with the slide member 90, is moved in an extending direction (front-rear direction). This changes the tension of the saw chain 30.

In the chainsaw 1 of the present embodiment as described above, the first gear 65 provided in the adjustment dial 60 of the chain tension mechanism 50 and the second gear 71 provided in the rotation transmission member 70 rotate about the axes extending in the right-left direction, as shown in FIG. 2. Here, when two gears rotating about two axes in the same direction, respectively, are meshed, the modules of gear teeth of the gears are increased to enhance the strength of the gear teeth. Therefore, in the chain tension mechanism 50 of the present embodiment, the strength of the first gear 65 is enhanced so that the first gear 65 made of resin is prevented from being damaged by the second gear 71 made of metal.

The chain tension mechanism 50 of the present embodiment has a simplified configuration with the gear mechanism, and the tension of the saw chain 30 is easily adjusted by rotation of the adjustment dial 60, without use of tools.

In the chain tension mechanism 50 of the present embodiment, the gear ratio of the second gear 71 of the rotation transmission member 70 to the first gear 65 of the adjustment dial 60 is set in a range of 0.1 and 0.5, and the maximum outer diameter of the first gear 65 is formed larger than the maximum outer diameter of the second gear 71. Then, the outer diameter of the adjustment dial 60 is also formed large in accordance with the outer diameter of the first gear 65. Thus, if the outer diameter of the adjustment dial 60 is increased, the operator can easily hold, and apply a rotational force to, the adjustment dial 60. Further, the guide bar is moved with a less force because a movement amount of the guide bar 20 becomes larger with respect to a rotation amount of the adjustment dial 60

In the chain tension mechanism 50 of the present embodiment, the adjustment dial 60 is rotated about the axis in the width direction (right-left direction) of the chainsaw body 10, as shown in FIG. 1, to avoid the chainsaw body 10 from being increased in width, even with the increase in outer diameter of the adjustment dial 60.

Further, in the chain tension mechanism 50 of the present embodiment, the adjustment dial 60 is made of resin, to avoid the chain tension mechanism 50 from being increased in weight, even with the increase in outer diameter of the adjustment dial 60.

In the chain tension mechanism 50 of the present embodiment, as shown in FIG. 3, the adjustment dial 60 is formed, on the outer circumferential surface thereof, with the rib 64, and with the first gear 65 at a portion thereof closer to the base end than the rib 64. With the configuration, the rib 64 prevents dust from entering the first gear 65 from outside the chainsaw body 10.

The embodiment of the present disclosure has been described above, but the present disclosure is not limited to the above-described embodiment and can be modified as appropriate within the scope of the present disclosure. In the chain tension mechanism 50 of the present embodiment, the first gear 65 of the adjustment dial 60 and the second gear 71 of rotation transmission member 70 are spur gears, as shown in FIG. 1, but a type of each of the gears is not limited as long as the gears rotate about axes extending in the right-left direction. For example, the first gear 65 and second gear 71 may be helical gears.

In the chain tension mechanism 50 of the present embodiment, the gear ratio of the second gear 71 to the first gear 65 is set in a range of 0.1 and 0.5, but is not limited thereto.

In the chain tension mechanism 50 of the present embodiment, the maximum outer diameter of the first gear 65 is formed larger than the maximum outer diameter of the second gear 71, but the size of each of the outer diameters of the first gear 65 and second gear 71 is not limited.

What is claimed is:

1. A chainsaw comprising:

a chainsaw body;

a guide bar extending in a front-rear direction, with a rear of the guide bar coupled to the chainsaw body; and a chain tension mechanism for adjusting tension of a saw chain wound around an outer circumference of the guide bar, wherein the chain tension mechanism includes:

on an outer surface of the chainsaw body, an adjustment dial made of resin and rotatable about an axis in a right-left direction; and inside the chainsaw body, a rotation transmission member made of metal and rotatable about an axis in the right-left direction, a feed screw member made of metal and rotatable about an axis in the front-rear direction, and a slide member coupled to the guide bar, the slide member is screwed to the feed screw member to move in the front-rear direction, with rotation of the feed screw member, a first gear formed on an outer circumference of the adjustment dial is meshed with a second gear formed on an outer circumference of the rotation transmission member, and a first bevel gear formed on the rotation transmission member is meshed with a second bevel gear formed on the feed screw member, the adjustment dial is formed, at a portion thereof closer to a distal end thereof, with a held portion, the adjustment dial is formed, at a portion thereof closer to a base end thereof, with the first gear, and a ratio of a maximum outer diameter of the held portion to a maximum outer diameter of the second gear is in a range of 4:1 to 5:1.

2. The chainsaw according to claim 1, wherein the first gear and the second gear are spur gears arranged side by side in the chainsaw body.

3. The chainsaw according to claim 1, wherein a maximum outer diameter of the first gear is formed larger than a maximum outer diameter of the second gear.

4. The chainsaw according to claim 3, wherein a gear ratio of the second gear to the first gear is set in a range of 0.1 to 0.5.

5. The chainsaw according to claim 3, wherein a ratio of the maximum outer diameter of the first gear to the maximum outer diameter of the second gear is in a range of 2:1 to 8:1.

6. The chainsaw according to claim 3, wherein a ratio of the maximum outer diameter of the first gear to the maximum outer diameter of the second gear is in a range of 4:1 to 5:1.

7. A chainsaw comprising:

a chainsaw body;

a guide bar extending in a front-rear direction, with a rear of the guide bar coupled to the chainsaw body; and a chain tension mechanism for adjusting tension of a saw chain wound around an outer circumference of the guide bar, wherein the chain tension mechanism includes:

on an outer surface of the chainsaw body, an adjustment dial made of resin and rotatable about an axis in a right-left direction; and inside the chainsaw body, a rotation transmission member made of metal and rotatable about an axis in the right-left direction, a feed screw member made of metal and rotatable about an axis in the front-rear direction, and a slide member coupled to the guide bar, the slide member is screwed to the feed screw member to move in the front-rear direction, with rotation of the feed screw member, a first gear formed on an outer circumference of the adjustment dial is meshed with a second gear formed on an outer circumference of the rotation transmission member, and a first bevel gear formed on the rotation transmission member is meshed with a second bevel gear formed on the feed screw member, the adjustment dial is provided, on an outer circumferential surface thereof, with a rib extending in a circumferential direction, and the adjustment dial is formed, on the outer circumference thereof, with the first gear at a portion thereof closer to a base end thereof than the rib.

* * * * *